United States Patent
Wang et al.

(10) Patent No.: US 11,399,351 B2
(45) Date of Patent: Jul. 26, 2022

(54) POWER ALLOCATION METHOD FOR NON-ORTHOGONAL MULTIPLE ACCESS SYSTEM AND BASE STATION USING THE SAME

(71) Applicant: National Tsing Hua University, Hsinchu (TW)

(72) Inventors: Chin-Liang Wang, Hsinchu (TW); Cheng-Chun Hsieh, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 17/117,081

(22) Filed: Dec. 9, 2020

(65) Prior Publication Data

US 2022/0132444 A1 Apr. 28, 2022

(30) Foreign Application Priority Data

Oct. 22, 2020 (TW) .................................. 109136605

(51) Int. Cl.
*H04W 52/42* (2009.01)
*H04W 52/24* (2009.01)

(52) U.S. Cl.
CPC ............ *H04W 52/42* (2013.01); *H04W 52/24* (2013.01)

(58) Field of Classification Search
CPC ................................ H04W 52/42; H04W 52/24
USPC ........................................................ 370/329
See application file for complete search history.

(56) References Cited

U.S. PATENT DOCUMENTS

| 7,463,867 | B2 * | 12/2008 | Luo | H04L 1/0003 455/562.1 |
| 8,687,675 | B2 * | 4/2014 | Yu | H04L 27/2647 710/1 |
| 9,014,747 | B2 * | 4/2015 | Shin | H04W 52/262 455/69 |
| 11,075,786 | B1 * | 7/2021 | Shattil | H04L 12/413 |

(Continued)

FOREIGN PATENT DOCUMENTS

| WO | 2008144859 | 12/2008 | |
| WO | WO-2020210845 A2 * | 10/2020 | H04L 1/0001 |

(Continued)

OTHER PUBLICATIONS

"Office Action of Taiwan Counterpart Application", dated Aug. 23, 2021, p. 1-p. 4.

*Primary Examiner* — Nathan S Taylor
(74) *Attorney, Agent, or Firm* — JCIPRNET

(57) ABSTRACT

The disclosure provides a power allocation method for non-orthogonal multiple access (NOMA) systems and a base station thereof. The method includes the following steps: receiving a first channel estimation error parameter from first user equipment, and receiving a second channel estimation error parameter from second user equipment; configuring a first minimum rate requirement of the first user equipment and a second minimum rate requirement of the second user equipment; determining a power allocation factor according to the first channel estimation error parameter, the second channel estimation error parameter, the first minimum rate requirement, and the second minimum rate requirement; and determining first transmission power for the first user equipment and second transmission power for the second user equipment according to the power allocation factor.

18 Claims, 3 Drawing Sheets

(56) References Cited

U.S. PATENT DOCUMENTS

| | | | |
|---|---|---|---|
| 11,153,900 B2 * | 10/2021 | Kim | H04L 5/0051 |
| 2006/0166626 A1 * | 7/2006 | Luo | H04L 1/0025 |
| | | | 455/69 |
| 2011/0243273 A1 * | 10/2011 | Song | H04B 7/0632 |
| | | | 375/295 |
| 2018/0026743 A1 * | 1/2018 | Zhang | H04L 5/0092 |
| | | | 370/329 |
| 2018/0269935 A1 * | 9/2018 | Wang | H04B 7/0426 |
| 2018/0294997 A1 * | 10/2018 | Lee | H04L 25/0236 |
| 2019/0254043 A1 * | 8/2019 | Makki | H04W 52/247 |
| 2020/0007246 A1 * | 1/2020 | Chang | H04B 17/382 |
| 2020/0112962 A1 * | 4/2020 | Wang | H04W 72/0473 |
| 2021/0314878 A1 * | 10/2021 | Goken | H04W 52/243 |
| 2021/0329533 A1 * | 10/2021 | Kim | H04W 4/06 |
| 2021/0336819 A1 * | 10/2021 | Kim | H04L 27/2613 |
| 2022/0109479 A1 * | 4/2022 | Liu | H04L 25/0224 |

FOREIGN PATENT DOCUMENTS

| | | | |
|---|---|---|---|
| WO | WO-2021155944 A1 * | 8/2021 | |
| WO | WO-2021240475 A1 * | 12/2021 | |

\* cited by examiner

POWER ALLOCATION METHOD FOR NON-ORTHOGONAL MULTIPLE ACCESS SYSTEM AND BASE STATION USING THE SAME

CROSS-REFERENCE TO RELATED APPLICATION

This application claims the priority benefit of Taiwan application no. 109136605, filed on Oct. 22, 2020. The entirety of the above-mentioned patent application is hereby incorporated by reference herein and made a part of this specification.

TECHNICAL FIELD

The disclosure relates to a non-orthogonal multiple access system, and more particularly, to a power allocation method for a non-orthogonal multiple access system and a base station using the method.

BACKGROUND

Most of existing wireless communication systems use orthogonal multiple access (OMA) techniques, such as time-division multiple access, frequency-division multiple access, and code-division multiple access to avoid or reduce interference among signals from different users, so as to achieve good transmission performance. With the increasing popularity of network services and applications, the system capacity requirements for wireless communications will become higher and higher in the future, and thus it is necessary to continuously improve the multiple access technology. Recently, non-orthogonal multiple access (NOMA) has been considered a promising technique due to the fact that it can improve a utilization efficiency of system resources to achieve higher system capacity than OMA techniques.

In a NOMA system, user multiplexing can be performed in the power domain. Specifically, for downlink NOMA transmission, message signals intended to multiple pieces of user equipment (UE) can be superposed at the base station with appropriate power allocation among the users, such that the same channel resources (e.g., the same time and frequency) can be shared by the users for signal transmission. Although this power-domain NOMA transmission technique will cause inter-user interference, a successive interference cancellation (SIC) technique can be used at each UE being a receiver to recover the corresponding message signals.

Regarding design of a power-domain NOMA system, there are still a number of issues worthy of investigation. For example, power allocation among users will significantly affect the system performance and needs to be further improved. Most existing power allocation methods for NOMA transmission were developed under an assumption of perfect channel estimation, but channel estimation results for practical environments are usually imperfect. Therefore, it is important to develop a high-efficiency and high-performance power allocation method for NOMA systems with imperfect channel estimation.

SUMMARY

The disclosure provides a power allocation method for a non-orthogonal multiple access (NOMA) system and a base station using the same. The method allows the base station to determine a power allocation factor according to channel estimation errors returned by pieces of user equipment (UE), and can provide good system performance under practical environments with imperfect channel estimation.

The power allocation method provided by the disclosure is suitable for a NOMA system and adapted to a base station. The method includes the following steps: receiving a first channel estimation error parameter from first UE, and receiving a second channel estimation error parameter from second UE; configuring a first minimum rate requirement of the first UE and a second minimum rate requirement of the second UE; determining a power allocation factor according to the first channel estimation error parameter, the second channel estimation error parameter, the first minimum rate requirement, and the second minimum rate requirement; and determining first transmission power for the first UE and second transmission power for the second UE according to the power allocation factor.

The base station of the disclosure is adapted to serve first UE and second UE in a downlink NOMA system, and includes a transceiver, a storage circuit, and a processor. The transceiver is configured to transmit messages to the first UE and the second UE. The storage unit stores a plurality of modules. The processor is coupled to the storage circuit and the transceiver, and configured to access the modules and execute steps of: receiving a first channel estimation error parameter from the first UE, and receiving a second channel estimation error parameter from the second UE; configuring a first minimum rate requirement of the first UE and a second minimum rate requirement of the second UE; determining a power allocation factor according to the first channel estimation error parameter, the second channel estimation error parameter, the first minimum rate requirement, and the second minimum rate requirement; and determining first transmission power for the first UE and second transmission power for the second UE according to the power allocation factor.

Based on the above, in the embodiments of the disclosure, after performing channel estimation for a downlink NOMA system, the first UE and the second UE respectively return the first channel estimation error parameter and the second channel estimation error parameter to the base station. Then, the base station can determine the power allocation factor according to the first channel estimation error parameter and the second channel estimation error parameter, and allocate an amount of total transmission power to the first UE and the second UE according to the power allocation factor. In this way, the disclosure can effectively improve the performance of the NOMA system with imperfect channel estimation, and ensure the minimum rate requirements of the first UE and the second UE.

To make the aforementioned more comprehensible, several embodiments accompanied with drawings are described in detail as follows.

DETAILED DESCRIPTION

Figure 1:
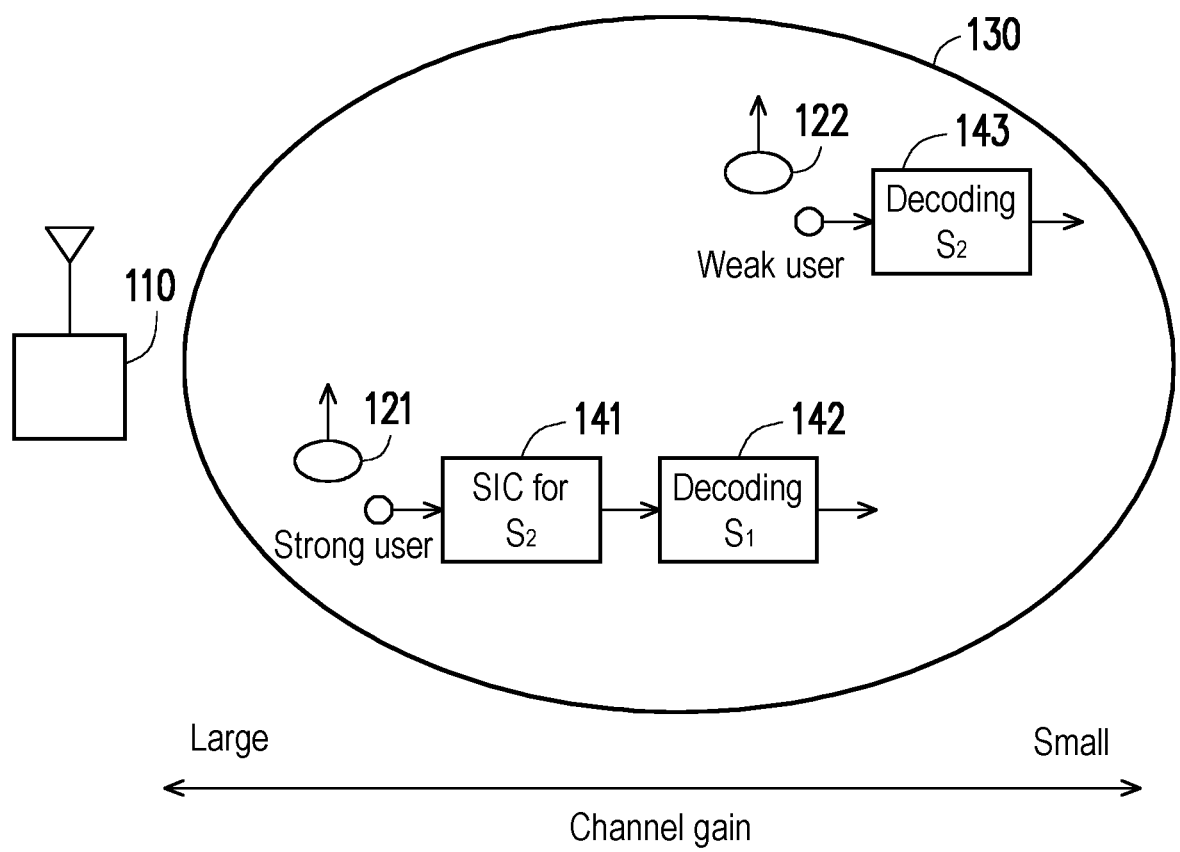
FIG. 1 is a schematic diagram illustrating a NOMA system according to an embodiment of the disclosure.

Refer to FIG. 1. It is a schematic diagram illustrating a NOMA system according to an embodiment of the disclosure. In this embodiment, a NOMA system 100 includes a base station 110, first user equipment (UE) 121, and second UE 122. The first UE 121 and the second UE 122 are located within a coverage 130 of the base station 110 and served by the base station 110. Here, the first UE 121 (i.e., a strong user) has a larger channel gain, and the second UE 122 (i.e., a weak user) has a smaller channel gain.

The first UE 121 and the second UE 122 may be implemented as, for example, but not limited to, a mobile station, an advanced mobile station (AMS), a server, a user terminal, a desktop computer, a laptop computer, a network computer, a workstation, a personal digital assistant (PDA), a tablet personal computer (tablet PC), a scanner, a phone device, a pager, a camera, a television, a handheld video game device, a music device, a wireless sensor, and the like.

The base station 110 may be (but not limited to), for example, a gNB, an eNB, a home eNB, an advanced base station (ABS), a base transceiver system (BTS), an access point, a home BS, a relay, an intermediate node, an intermediate equipment, a satellite-based communication base station, or a combination thereof.

Figure 2:
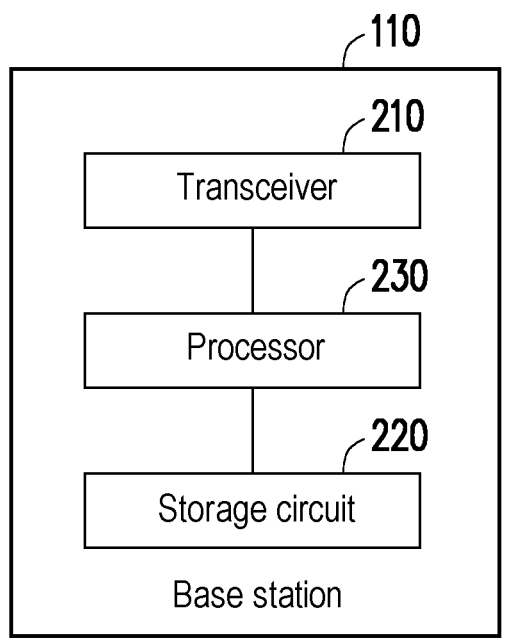
FIG. 2 is a block diagram illustrating a base station according to an embodiment of the disclosure.

Refer to FIG. 2. It is a block diagram illustrating a base station according to an embodiment of the disclosure. In this embodiment, the base station 110 can at least include (but not limited to) a transceiver 210, a storage circuit 220, and a processor 230. The transceiver 210 may include a transmitter circuit, an analog-to-digital converter, a digital-to-analog converter, a low-noise amplifier, a mixer, a filter, an impedance matcher, a transmission line, a power amplifier, one or more antenna circuits, and a local storage medium element, such that the base station 110 can provide wireless transmitting/receiving functions to the first UE 121 and the second UE 122. The storage circuit 220 is, for example, a memory, a hard disk or other elements capable of storing data, and may be configured to record a plurality of program codes or modules.

The processor 230 is coupled to the transceiver 210 and the storage circuit 220, and may be a processor for general purposes, a processor for special purposes, a conventional processor, a digital signal processor, a plurality of microprocessors, one or more microprocessors, controllers and microcontrollers which are combined with a core of the digital signal processor, an application specific integrated circuit (ASIC), a field programmable gate array (FPGA), any other integrated circuits, a state machine, a processor based on advanced RISC machine (ARM), or the like.

In this embodiment, the processor 230 can access and execute the program codes stored in the storage circuit 220 to perform a power allocation method proposed by the disclosure. The corresponding details are described below. In order to clearly explain the principle of the disclosure, the following description is provided with an example in which the first UE 121 and the second UE 122 communicate with the base station 110 through a single-input single-output (SISO) channel.

Refer back to FIG. 1. In the NOMA system 100, in order to correctly demodulate signals transmitted by the base station 110 at receiver ends (i.e., the first UE 121 and the second UE 122), the base station 110 can perform power allocation, where the signal of a weak user is allocated with more transmission power and the signal of a strong user is allocated with less transmission power. More specifically, the base station 110 can respectively allocate first transmission power $P_1$ and second transmission power $P_2$ to complex signals $s_1$ and $s_2$ to be transmitted to the first UE 121 and the second UE 122 before superposing the signals, and transmit a superposed complex signal x to the first UE 121 and the second UE 122. In this embodiment, the superposed complex signal x to be transmitted can be expressed as equation (1):

$$x=\sqrt{P_1}s_1+\sqrt{P_2}s_2. \quad (1)$$

In the case where a channel gain of the first UE 121 is assumed to be greater than a channel gain of the second UE 122, the first transmission power $P_1$ needs to be less than the second transmission power $P_2$, and a sum of the first transmission power $P_1$ and the second transmission power $P_2$ is equal to total transmission power $P_T$ of the NOMA system 100.

In this embodiment, a true complex channel fading coefficient between the base station 110 and the first UE 121 is denoted by $h_1$, and a true complex channel fading coefficient between the base station 110 and the second UE 122 is denoted by $h_2$. Correspondingly, a channel (power) gain between the base station 110 and the first UE 121 can be denoted by $|h_1|^2$, and a channel (power) gain between the base station 110 and the second UE 122 can be denoted by $|h_2|^2$. Thus, the complex signals $y_1$ and $y_2$ received by the first UE 121 and the second UE 122 can be respectively expressed as equations (2) and (3):

$$y_1=h_1x+v_1=\sqrt{P_1}h_1s_1+\sqrt{P_2}h_1s_2+v_1 \quad (2)$$

$$y_2=h_2x+v_2=\sqrt{P_1}h_2s_1+\sqrt{P_2}h_2s_2+v_2 \quad (3)$$

where $v_1$ and $v_2$ are zero-mean complex additive white Gaussian noises (AWGN), and their corresponding variances or powers are respectively assumed to be $N_{0,1}$ and $N_{0,2}$, i.e., $v_1$ and $v_2$ can be respectively denoted by $CN(0, N_{0,1})$ and $CN(0, N_{0,2})$. It is also assumed here that $N_{0,1}=N_{0,2}=N_0$. Since $|h_1|^2>|h_2|^2$, the received signal power of power of $y_1$ is greater than that of $y_2$.

In this embodiment, with consideration of the occurrence of imperfect channel estimation, equations (2) and (3) can be respectively expressed as equations (4) and (5):

$$y_1\sqrt{P_1}(\hat{h}_1+\Delta h_1)s_1+\sqrt{P_2}(\hat{h}_1+\Delta h_1)s_2+v_1 \quad (4)$$

$$y_2\sqrt{P_1}(\hat{h}_2+\Delta h_2)s_1+\sqrt{P_2}(\hat{h}_2+\Delta h_2)s_2+v_2 \quad (5)$$

where a channel fading coefficient estimate obtained from performing channel estimation by the first UE 121 is denoted by $\hat{h}_1$, and a corresponding channel estimation error is denoted by $\Delta h_1$ with zero mean and variance $\sigma_{\Delta h_1}^2$; a channel fading coefficient estimate obtained from performing channel estimation by the second UE 122 is denoted by $\hat{h}_2$, and a corresponding channel estimation error is denoted by $\Delta h_2$ with zero mean and variance $\sigma_{\Delta h_2}^2$. Both $\Delta h_1$ and $\Delta h_2$ are assumed to be complex Gaussian distributed and can be respectively denoted by $CN(0,\sigma_{\Delta h_1}^2)$ and $CN(0,\sigma_{\Delta h_2}^2)$. Here, $\sigma_{\Delta h_1}^2$ and $\sigma_{\Delta h_2}^2$ can be interpreted as mean-squared errors (MSEs) of the corresponding channel estimations, and reflect channel estimation qualities for the first UE 121 and the second UE 122, respectively.

According to the NOMA principle, the strong user having a larger channel gain should be allocated with smaller transmission power. In this case, the first UE 121 can remove the interference based on the signal $s_2$ through an SIC process (e.g., a block 141 of FIG. 1) and then directly decode its own signal $s_1$ (e.g., a block 142 of FIG. 1) On the other hand, for the weak user having a smaller channel gain, since the interference caused by the signal of the strong user can be regarded as noise, the second UE 122 can directly decode its own signal (e.g., a block 143 of FIG. 1).

In the case where the signals $s_1$ and $s_2$ are successfully decoded with imperfect channel estimation conditions, channel capacity lower bounds of the first UE 121 and the second UE 122 can be respectively expressed as equations (6) and (7):

$$C_{lower,1} = \log_2\left(1 + \frac{P_1|\hat{h}_1|^2}{P_T\sigma_{\Delta h_1}^2 + N_0}\right) \quad (6)$$

$$C_{lower,2} = \log_2\left(1 + \frac{P_2|\hat{h}_2|^2}{P_T\sigma_{\Delta h_1}^2 + P_1|\hat{h}_2|^2 + N_0}\right). \quad (7)$$

It should be noted that, when the first UE 121 uses a channel fading coefficient estimate $\hat{h}_1$ to perform a SIC procedure, because $\sqrt{P_2}\Delta h_1 s_2$ in equation (4) cannot be completely removed, the channel capacity lower bound $C_{lower,1}$ of the first UE 121 can be expressed as equation (6); on the other hand, because $\sqrt{P_2}h_2 s_2$ generated based on the channel estimation error may be considered as an additional interference, the channel capacity lower bound $C_{lower,2}$ of the second UE 122 can be expressed as equation (7).

According to equations (6) and (7), it can been seen that the channel capacity lower bounds $C_{lower,1}$ and $C_{lower,2}$ of the first UE 121 and the second UE 122 are related to the first transmission power $P_1$ and the second transmission power $P_2$, respectively. In other words, the power allocation for the signals $s_1$ and $s_2$ can directly affect the channel capacity lower bounds $C_{lower,1}$ and $C_{lower,2}$ of the first UE 121 and the second UE 122. It should be noted that, since the existence of channel estimation errors makes it difficult to obtain accurate channel capacity expressions, the subsequent derivation will be based on the channel capacity lower bounds defined in this embodiment.

In this embodiment, with consideration of quality of service (QoS) of the first UE 121 and the second UE 122, minimum rate requirements are additionally defined. Specifically, the base station 110 configures a first minimum rate requirement $R_1^T$ for the first UE 121, and configure a second minimum rate requirement $R_2^T$ for the second UE 122. Therefore, a system outage may occur in the following three situations. (1) A data transmission rate at which the first UE 121 can successfully decode the signal $s_2$ is less than the second minimum rate requirement $R_2^T$. This situation will make the interference based on the signal $s_2$ unable to be smoothly removed through the SIC procedure, thereby reducing the probability and the data transmission rate at which the first UE 121 can successfully decode its own signal $s_1$. (2) The data transmission rate at which the first UE 121 can successfully decode its own signal $s_1$ is less than the first minimum rate requirement $R_1^T$. (3) A data transmission rate at which the second UE 122 can successfully decode its own signal $s_2$ is less than the second minimum rate requirement $R_2^T$.

In the case where channel estimation errors occur, an accurate system outage probability cannot be obtained. Therefore, in this embodiment of the disclosure, the channel capacity lower bound corresponding to each UE in the NOMA system is regarded as a data transmission rate lower bound at which the corresponding UE can successfully decode its own signal or the signal of the other, and an upper bound of the system outage probability is determined based on a plurality of constraints related to the first minimum rate requirement $R_1^T$ (unit: bps/Hz) and the second minimum rate requirement $R_2^T$ (unit: bps/Hz). More specifically, by making $R_{i,j}$ denote a data transmission rate lower bound at which i-th UE can successfully decode a signal of j-th UE, the constraints used for determining the system outage probability upper bound can be expressed as follows:

$$R_{1,2} = \log_2\left(1 + \frac{P_2|\hat{h}_1|^2}{P_T\sigma_{\Delta h_1}^2 + P_1|\hat{h}_1|^2 + N_0}\right) \geq R_2^T \quad (8)$$

$$R_{1,1} = \log_2\left(1 + \frac{P_1|\hat{h}_1|^2}{P_T\sigma_{\Delta h_1}^2 + N_0}\right) \geq R_1^T \quad (9)$$

$$R_{2,2} = \log_2\left(1 + \frac{P_2|\hat{h}_2|^2}{P_T\sigma_{\Delta h_2}^2 + P_1|\hat{h}_2|^2 + N_0}\right) \geq R_2^T. \quad (10)$$

Here, expression (8) represents that a data transmission rate lower bound $R_{1,2}$ at which the first UE 121 can successfully decode the signal $s_2$ is greater than or equal to the second minimum rate requirement $R_2^T$; expression (9) represents that a data transmission rate lower bound $R_{1,1}$ at which the first UE 121 can successfully decode its own signal $s_1$ is greater than or equal to the first minimum rate requirement $R_1^T$; expression (10) represents that a data transmission rate lower bound $R_{2,2}$ at which the second UE 122 can successfully decode its own signal $s_2$ is greater than or equal to the second minimum rate requirement $R_1^T$.

Based on the above, a system outage probability upper bound $P_{upper}$ can be expressed as equation (11):

$$P_{upper} = 1 - Pr\{R_{1,2} \geq R_2^T, R_{1,1} \geq R_1^T, R_{2,2} \geq R_2^T\}. \quad (11)$$

Therefore, when the total transmission power is $P_T$, an optimization problem for minimizing the system outage probability upper bound $P_{upper}$ can be expressed as:

$$\min_{\{P_1, P_2\}} P_{upper} \quad (12a)$$

$$\text{subject to } P_1 + P_2 = P_T \quad (12b)$$

$$P_1 > 0, P_2 > 0, P_2 > P_1. \quad (12c)$$

In this optimization problem, expression (12a) means that the first transmission power $P_1$ and the second transmission power $P_2$ need to be found for minimizing the system outage probability upper bound $P_{upper}$; expression (12b) represents a constraint that the sum of the first transmission power $P_1$ and the second transmission power $P_2$ needs to match the total transmission power $P_T$; and expression (12c) represents the NOMA principle that the second transmission power $P_2$ (for the weak user) needs to be greater than the first transmission power $P_1$ (for the strong user).

Here, for the first UE 121 and the second UE 122, a power allocation factor can be defined and denoted by α. Accordingly, the first transmission power allocated for the first UE 121 can be expressed as $P_1 = \alpha P_T$, and the second transmission power allocated for the second UE 122 can be expressed as $P_2 = P_T - P_1$. In this case, the optimization problem above can be rewritten as:

$$\min_{\{\alpha\}} P_{upper} \quad (13a)$$

$$\text{subject to } P_1 + P_2 = P_T \quad (13b)$$

$$0 < \alpha < 1/2. \quad (13c)$$

To solve the optimization problem of expressions (13a) to (13c), it is assumed that the channel fading coefficient estimate $\hat{h}_1$ is a complex Gaussian random variable with zero mean and variance $\sigma_{\hat{h}_1}^2$, i.e., $\hat{h}_1$ can be denoted by $CN(0, \sigma_{\hat{h}_1}^2)$; similarly, it is assumed that the channel fading coefficient estimate $\hat{h}_2$ is a complex Gaussian random variables with zero mean and variance $\sigma_{\hat{h}_2}^2$, i.e., $\hat{h}_2$ can be denoted by $CN(0,\sigma_{\hat{h}_2}^2)$ In this case, $Pr\{R_{1,2} \geq R_2^T, R_{1,1} \geq R_1^T, R_{2,2} \geq R_2^T\}$ in equation (11) can be expressed as equation (14):

$$Pr\{R_{1,2} \geq R_2^T, R_{1,1} \geq R_1^T, R_{2,2} \geq R_2^T\} = \quad (14)$$

$$Pr\begin{Bmatrix} (1-\alpha-\alpha\phi_2)P_T|\hat{h}_1|^2 \geq (N_0 + P_T\sigma_{\Delta h_1}^2)\phi_2, \\ \alpha P_T|\hat{h}_1|^2 \geq (N_0 + P_T\sigma_{\Delta h_1}^2)\phi_1, \\ (1-\alpha-\alpha\phi_2)P_T|\hat{h}_2|^2 \geq (N_0 + P_T\sigma_{\Delta h_2}^2)\phi_2 \end{Bmatrix}$$

where $\phi_1 = 2^{R_1T} - 1$ and $\phi_2 = 2^{R_2T} - 1$.

In equation (14), in the case where $\alpha \leq 0$ or $(1-\alpha-\alpha\phi_2) \leq 0$, $Pr\{R_{1,2} \geq R_2^T, R_{1,1} \geq R_1^T, R_{2,2} \geq R_2^T\} = 0$, which violates the operating principle of NOMA. When $0 < \alpha < 1/(1+\phi_2)$, because $|\hat{h}_1|^2$ and $|\hat{h}_2|^2$ are independent of each other, equation (14) can be expressed as $Q_1Q_2$, where $Q_2$ can be expressed as equation (15); $Q_1$ can be expressed as equation (16) under condition (17), and $Q_1$ can be expressed as equation (18) under condition (19).

$$Q_2 = Pr\left\{|\hat{h}_2|^2 \geq \frac{(N_0 + P_T\sigma_{\Delta h_2}^2)\phi_2}{(1-\alpha-\alpha\phi_2)P_T}\right\} = e^{-\frac{(N_0+P_T\sigma_{\Delta h_2}^2)\phi_2}{(1-\alpha-\alpha\phi_2)P_T\sigma_{\hat{h}_2}^2}} \quad (15)$$

$$Q_1 = Pr\left\{|\hat{h}_1|^2 \geq \frac{(N_0 + P_T\sigma_{\Delta h_1}^2)\phi_2}{(1-\alpha-\alpha\phi_2)P_T}\right\} = e^{-\frac{(N_0+P_T\sigma_{\Delta h_1}^2)\phi_2}{(1-\alpha-\alpha\phi_2)P_T\sigma_{\hat{h}_1}^2}} \quad (16)$$

$$\phi_1/(\phi_1 + \phi_2 + \phi_1\phi_2) < \alpha < 1/(1+\phi_2) \quad (17)$$

$$Q_1 = Pr\left\{|\hat{h}_1|^2 \geq \frac{(N_0 + P_T\sigma_{\Delta h_1}^2)\phi_2}{\alpha P_T}\right\} = e^{-\frac{(N_0+P_T\sigma_{\Delta h_1}^2)\phi_1}{\alpha P_T\sigma_{\hat{h}_1}^2}} \quad (18)$$

$$0 < \alpha < \phi_1/(\phi_1 + \phi_2 + \phi_1\phi_2) \quad (19)$$

After $Q_1$ and $Q_2$ are obtained, equation (11) can be expressed as $P_{upper} = 1 - Q_1Q_2$, which means that the optimization problem for minimizing $P_{upper}$ is equivalent to maximizing $Q_1Q_2$. Thus, with $f(\alpha) = Q_1Q_2$, and the optimization problem for minimizing $P_{upper}$ is equivalent to an optimization problem for maximizing $f(\alpha)$ as follows:

$$\min_{\{\alpha\}} f(\alpha) \quad (20a)$$

$$\text{subject to } P_1 + P_2 = P_T \quad (20b)$$

$$0 < \alpha < 1/2. \quad (20c)$$

In equation (16), when $\phi_1/(\phi_1+\phi_2+\phi_1\phi_2) < \alpha < 1/(1+\phi_2)$, $Q_1$ is a strictly decreasing function. In equation (18), when $\phi < \alpha < \phi_1/(\phi_1+\phi_2+\phi_1\phi_2)$, $Q_1$ is a strictly increasing function. In equation (15), when $0 < \alpha < 1/(1+\phi_2)$, $Q_2$ is a strictly decreasing function. Thus, a maximum value of $f(\alpha)$ is at $0 < \alpha < \phi_1/(\phi_1+\phi_2+\phi_1\phi_2)$.

Based on the above description, $f(\alpha)$ can be expressed as equation (21):

$$f(\alpha) = e^{-\frac{(N_0+P_T\sigma_{\Delta h_1}^2)\phi_1}{\alpha P_T\sigma_{\hat{h}_1}^2}} e^{-\frac{(N_0+P_T\sigma_{\Delta h_2}^2)\phi_2}{(1-\alpha-\alpha\phi_2)P_T\sigma_{\hat{h}_2}^2}} \quad (21)$$

By differentiating $f(\alpha)$, an optimal power allocation factor $\alpha_{IP}^{opt}$ for obtaining the maximum value of $f(\alpha)$ is expressed as equation (22):

$$\alpha_{IP}^{opt} = \frac{1}{\sqrt{\frac{\sigma_{\hat{h}_1}^2(\phi_2 + \phi_2^2)(\sigma_{\Delta h_2}^2 P_T + N_0)}{\sigma_{\hat{h}_2}^2 \phi_1(\sigma_{\Delta h_1}^2 P_T + N_0)}} + 1 + \phi_2} \quad (22)$$

Here, to ensure that $0 < \alpha_{IP}^{opt} < 1/2$, $\phi_1$ and $\phi_2$ need to satisfy $(\phi_1/(1+\phi_1)) \leq \phi_2$. This optimal power allocation factor $\alpha_{IP}^{opt}$ can minimize the system outage probability upper bound $P_{upper}$, and ensure that each of the first UE 121 and the second UE 122 has a minimum transmission rate; The base station 110 can perform the power allocation according to equation (22), so as to perform NOMA transmission with the first UE 121 and the second UE 122.

In addition, for the first UE 121 and the second UE 122, normalized MSEs of the channel estimations can be defined and respectively expressed as $\tilde{\sigma}_{\Delta h_1}^2 = \sigma_{\Delta h_1}^2/\sigma_{h_1}^2$ and $\tilde{\sigma}_{\Delta h_2}^2 = \sigma_{\Delta h_2}^2/\sigma_{h_2}^2$. In practical applications, it is assumed that channel estimation qualities of the first UE 121 and the second UE 122 are close (i.e $\tilde{\sigma}_{\Delta h_1}^2$ approximates $\tilde{\sigma}_{\Delta h_2}^2$). In this case, $\sigma_{\hat{h}_1}^2/\sigma_{\hat{h}_2}^2$ in equation (22) can be replaced by $\sigma_{\Delta h_1}^2/\sigma_{\Delta h_2}^2$. Accordingly, in the case where the base station 110 does not know the variances $\sigma_{\hat{h}_1}^2$ and $\sigma_{\hat{h}_2}^2$ of the channel fading coefficient estimates, the base station 110 can perform the power allocation according to an approximate solution of the optimal power allocation factor $\alpha_{IP}^{opt}$ in equation (23) with $(\phi_1/(1+\phi_1)) \leq \phi_2$ so as to perform the NOMA transmission with the first UE 121 and the second UE 122.

$$\alpha_{IP}^{opt} \approx \frac{1}{\sqrt{\frac{\sigma_{\Delta h_1}^2(\phi_2 + \phi_2^2)(\sigma_{\Delta h_2}^2 P_T + N_0)}{\sigma_{\Delta h_2}^2 \phi_1(\sigma_{\Delta h_1}^2 P_T + N_0)}} + 1 + \phi_2} \quad (23)$$

Thus, in an embodiment, after the channel estimation is performed by each of the first UE 121 and the second UE 122, each the first UE 121 and the second UE 122 can generate channel estimation information. By returning the channel estimation information to the base station 110, the base station 110 can directly determine the power allocation factor based on equation (22) or (23), and accordingly determine the first transmission power for the first UE 121 and the second transmission power for the second UE 122. From the above description, it can be seen that the power allocation factor determined based on equation (22) or (23) can minimize (or approximately minimize) the system outage probability upper bound $P_{upper}$, and ensure that each of the first UE 121 and the second UE 122 has a minimum transmission rate.

In the foregoing embodiment, it is assumed that the channel between the base station 110 and each of the first UE 121 and the second UE 122 is a single-input single-output (SISO) scenario. However, in other embodiments, the method proposed by the disclosure can also be extended to a multiple-input multiple-output (MIMO) scenario. Specifically, in an embodiment, the base station 110 can communicate with the first UE 121 and the second UE 122 through a MIMO channel. Here, it is assumed that the base station 110 has $M_T$ transmitting antennas; each of the first UE 121 and the second UE 122 has $M_R$ receiving antennas; and a smaller value between $M_T$ and $M_R$ is denoted by $M_{min}$.

In this embodiment, true channel matrices between the base station 110 and the first UE 121 and the second UE 122 are respectively denoted by complex matrices $H_1$ and $H_2$ of $M_R \times M_T$, and Frobenius norms $\|H_1\|_F^2$ and $\|H_2\|_F^2$ respectively represent corresponding MIMO channel gains. Under the assumption of $\|H_1\|_F^2 > \|H_2\|_F^2$, the base station 110 can respectively allocate the first transmission power $P_1$ and the second transmission power $P_2$ to $M_T \times 1$ complex vector signals $s_1$ and $s_2$ to be transmitted to the first UE 121 and the second UE 122 before superposing the signals, and transmit the superposed $M_T \times 1$ complex vector signal x to the first UE 121 and the second UE 122. Here, the first transmission power $P_1$ is less than the second transmission power $P_2$, and the sum of the first transmission power $P_1$ and the second transmission power $P_2$ is equal to the total transmission power $P_T$ of the NOMA system 100. In the case of uniformly allocating the first transmission power $P_1$ and the second transmission power $P_2$ for the $M_T$ transmitting antennas, the superposed complex signal x to be transmitted can be expressed as equation (24):

$$x = \sqrt{P_1/M_T} s_1 + \sqrt{P_2/M_T} s_2. \quad (24)$$

Here, for the first UE 121 and the second UE 122, a power allocation factor can be defined (denoted by $\alpha$). Accordingly, the first transmission power allocated for the first UE 121 can be expressed as $P_1 = \alpha P_T$, and the second transmission power allocated for the second UE 122 can be expressed as $P_2 = P_T - P_1$.

Correspondingly, in the imperfect channel estimation environment, $M_T \times 1$ complex vector signals $y_1$ and $y_2$ received by the first UE 121 and the second UE 122 can be respectively expressed as equations (25) and (26):

$$y_1 = \sqrt{P_1/M_T}(\hat{H}_1 + \Delta H_1) s_1 + \sqrt{P_2/M_T}(\hat{H}_1 + H_1) s_2 + v_1 \quad (25)$$

$$y_2 = \sqrt{P_1/M_T}(\hat{H}_2 + \Delta H_2) s_1 + \sqrt{P_2/M_T}(\hat{H}_2 + H_2) s_2 + v_2 \quad (26)$$

where $v_1$ and $v_2$ are complex Gaussian noise vectors, and each element of the noise vectors is independent and identically distributed as $CN(0, N_0)$. A channel fading coefficient matrix estimate obtained from performing channel estimation by the first UE 121 is denoted by a matrix $\hat{H}_1$, and a corresponding channel estimation error matrix is denoted by $\Delta H_1$. A channel fading coefficient matrix estimate obtained from performing channel estimation by the second UE 122 is denoted by a matrix $\hat{H}_2$, and a corresponding channel estimation error matrix is denoted by $\Delta H_2$. All of $\hat{H}_1$, $H_2$, $\Delta H_1$, and $\Delta H_2$ are $M_R \times M_T$ complex matrices.

In this embodiment, each element of $\hat{H}_1$ is assumed to be independent and identically complex Gaussian distributed as $CN(0, \sigma_{\hat{H}_1}^2)$; each element of $\hat{H}_2$ is assumed to be independent and identically complex Gaussian distributed as $CN(0, \sigma_{\hat{H}_2}^2)$; each element of $\Delta H_1$ is assumed to be independent and identically complex Gaussian distributed as $CN(0, \sigma_{\Delta H_1}^2)$; each element of $\Delta H_2$ is assumed to be independent and identically complex Gaussian distributed as $CN(0, \sigma_{\Delta H_2}^2)$. It should be noted that $\sigma_{\hat{H}_1}^2$ and $\sigma_{\hat{H}_2}^2$ are respectively variances of each element of $\hat{H}_1$ each element of $\hat{H}_2$ obtained from performing channel estimations by the first UE 121 and the second UE 122. $\sigma_{\Delta H_1}^2$ and $\sigma_{\Delta H_2}^2$ are respectively MSEs of the corresponding channel estimations for each element of $H_1$ and each element of $H_2$, and reflect channel estimation qualities for the first UE 121 and the second UE 122, respectively.

In the case where the signals $s_1$ and $s_2$ are successfully decoded with imperfect channel estimation conditions, channel capacity lower bounds of the first UE 121 and the second UE 122 can be respectively expressed as equations (27) to (28):

$$\tilde{C}_{lower,1} = \log_2 \det\left(I_{M_R} + ((P_T/M_T)E[\Delta H_1 \Delta H_1^H] + N_0 I_{M_R})^{-1}(P_1/M_T)(\hat{H}_1 \hat{H}_1^H)\right) \quad (27)$$

$$\tilde{C}_{lower,2} = \log_2 \det\left(\begin{matrix} I_{M_R} + ((P_T/M_T)E[\Delta H_2 \Delta H_2^H] + \\ (P_1/M_T)(\hat{H}_2 \hat{H}_2^H) + N_0 I_{M_R})^{-1} \\ (P_2/M_T)(\hat{H}_2 \hat{H}_2^H) \end{matrix}\right) \quad (28)$$

where $I_{M_R}$ is a $M_R \times M_R$ identity matrix and $(\bullet)^H$ represents a conjugate transpose operation.

Specifically, through singular value decomposition (SVD), $M_R \times M_T$ MIMO channels can be regarded as a set of $M_{min}$ parallel SISO subchannels. In addition, in a MIMO environment, the channel matrix estimates between the base station 110 and the first UE 121 and the second UE 122 are respectively $\hat{H}_1$ and $\hat{H}_2$, and the square of each singular value of a channel matrix $\hat{H}_n$ (n=1, 2) is a channel gain of each of the subchannels. In this case, an effective channel gain of the channel matrix $\hat{H}_n$ is a sum of all squared singular values, which can be obtained by computing the Frobenius norm $\|\hat{H}_n\|_F^2$ of the channel matrix $\hat{H}_n$. Then, an average effective channel gain of each of the parallel SISO subchannels in $\hat{H}_n$ can be expressed by $\|\hat{H}_n\|_F^2/M_{min}$, and equations (27) and (28) can be respectively simplified as equations (29) and (30):

$$\tilde{C}_{lower,1} \approx M_{min} \log_2\left(1 + \frac{P_1 \|\hat{H}_1\|_F^2/(M_{min} M_T)}{P_T(M_R \sigma_{\Delta H_1}^2) + N_0}\right) \quad (29)$$

$$\tilde{C}_{lower,2} \approx M_{min} \log_2\left(1 + \frac{P_2 \|\hat{H}_2\|_F^2/(M_{min} M_T)}{P_T(M_R \sigma_{\Delta H_2}^2) + P_1 \|\hat{H}_2\|_F^2/(M_{min} M_T) + N_0}\right) \quad (30)$$

Based on the assumptions and derivation principles similar to those in the aforementioned SISO scenario, in the MIMO environment, the optimal power allocation factor can be obtained by minimizing the system outage probability upper bound. When the base station 110 communicates with the first UE 121 and the second UE 122 through a MIMO channel, the corresponding optimal power allocation factor $\tilde{\alpha}_{IP}^{opt}$ can be expressed as equation (31):

$$\tilde{\alpha}_{IP}^{opt} \approx \frac{1}{\sqrt{\frac{(\sigma_{\hat{H}_1}^2/(M_{min} M_T))(\tilde{\phi}_2 + \tilde{\phi}_2^2)(M_R \sigma_{\Delta H_2}^2 P_T + N_0)}{(\sigma_{\hat{H}_2}^2/(M_{min} M_T))\tilde{\phi}_1(M_R \sigma_{\Delta H_1}^2 P_T + N_0)}} + 1 + \tilde{\phi}_2} \quad (31)$$

where $\tilde{\phi}_1 = 2^{R_1/M_{min}} - 1$, $\tilde{\phi}_2 = 2^{R_2/M_{min}} - 1$, and $(\tilde{\phi}_1/(1+\tilde{\phi}_1)) \le \tilde{\phi}_2$.

With an assumption that the channel estimation qualities of the first UE 121 and the second UE 122 are close, the optimal power allocation factor $\alpha_{IP}^{opt}$ of equation (31) can be approximated as equation (32):

$$\tilde{\alpha}_{IP}^{opt} \approx \frac{1}{\sqrt{\frac{(\sigma_{\Delta H_1}^2/(M_{min}M_T))(\tilde{\phi}_2+\tilde{\phi}_2^2)(M_R\sigma_{\Delta H_2}^2 P_T+N_0)}{(\sigma_{\Delta H_2}^2/(M_{min}M_T))\tilde{\phi}_1(M_R\sigma_{\Delta H_1}^2 P_T+N_0)}}+1+\tilde{\phi}_2} \quad (32)$$

where $\tilde{\phi}_1=2^{R_1^T/M_{min}}-1$, $\tilde{\phi}_2=2^{R_2^T/M_{min}}-1$, and $(\tilde{\phi}_1/(1+\tilde{\phi}_1))\le\tilde{\phi}_2$.

Based on the above, in an embodiment, when the first UE 121 and the second UE 122 communicate with the base station 110 through the MIMO channel, the base station 110 can directly determine the power allocation factor based on equation (31) or (32), and accordingly determine the first transmission power for the first UE 121 and the second transmission power for the second UE 122.

In view of this, an embodiment of the disclosure proposes a power allocation method in the NOMA system 100, which allows the base station 110 to efficiently determine the power allocation factor for the first UE 121 and the second UE 122 and improve the performance of the NOMA system 100 in the imperfect channel estimation environment. Further details are illustrated below.

Figure 3:
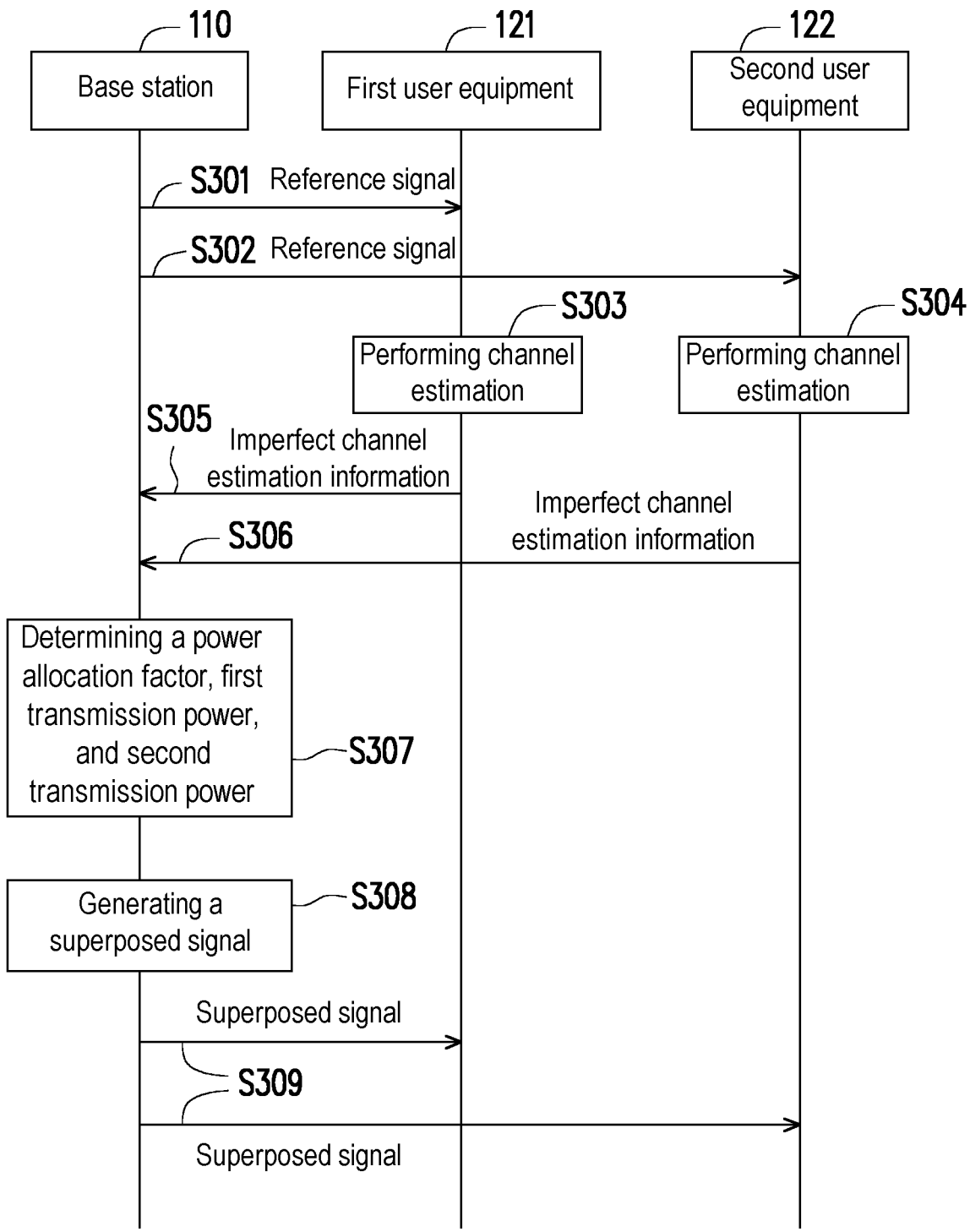
FIG. 3 is a first flowchart illustrating a power allocation method according to an embodiment of the disclosure.

Refer to FIG. 3. It is a first flowchart illustrating a power allocation method according to an embodiment of the disclosure. The method is adapted to the NOMA system 100 of FIG. 1, and each step of FIG. 3 will be described below with reference to each element shown in FIG. 1.

In brief, in an embodiment, in a downlink transmission of the NOMA system 100, the base station 110 can perform a power allocation according to imperfect channel estimation information to achieve better performance. Accordingly, in the embodiment shown in FIG. 3, in step S301 and step S302, the base station 110 transmits reference signals (RS) to the first UE 121 and the second UE 122. Next, in step S303, the first UE 121 can perform channel estimation according to the reference signal and obtain some imperfect channel estimation information. In step S303, the second UE 122 can perform channel estimation according to the reference signal and obtain some imperfect channel estimation information. For instance, the first UE 121 and the second UE 122 can perform the channel estimations by using a least-squares (LS) algorithm, a minimum mean-squared error (MMSE) algorithm, or other methods.

In step S305, the first UE 121 can return the imperfect channel estimation information to the base station 110. Similarly, in step S306, the second UE 122 can return the imperfect channel estimation information to the base station 110. In an embodiment, the first UE 121 and the second UE 122 can return the imperfect channel estimation information through a physical uplink control channel (PUCCH) or a physical uplink shared channel (PUSCH). The imperfect channel estimation information may be regarded as channel status information (CSI) including a channel estimation error parameter. In an embodiment, the first UE 121 and the second UE 122 can return their MSEs of the channel estimations.

In step S307, in the case where a first minimum rate requirement of the first UE 121 and a second minimum rate requirement of the second UE 122 are configured, the base station 110 can determine a power allocation factor according to the imperfect channel estimation information returned by the first UE 121 and the second UE 122, so as to determine first transmission power for the first UE 121 and second transmission power for the second UE 122. In an embodiment, the base station 110 determines the power allocation factor according to the MSEs of the channel estimations in the imperfect channel estimation information, generates a superposed signal according to the first transmission power for the first UE 121 and the second transmission power for the second UE 122 in step S308, and then send the superposed signal to the first UE 121 and the second UE 122 in step S309, so as to perform NOMA transmission.

Figure 4:
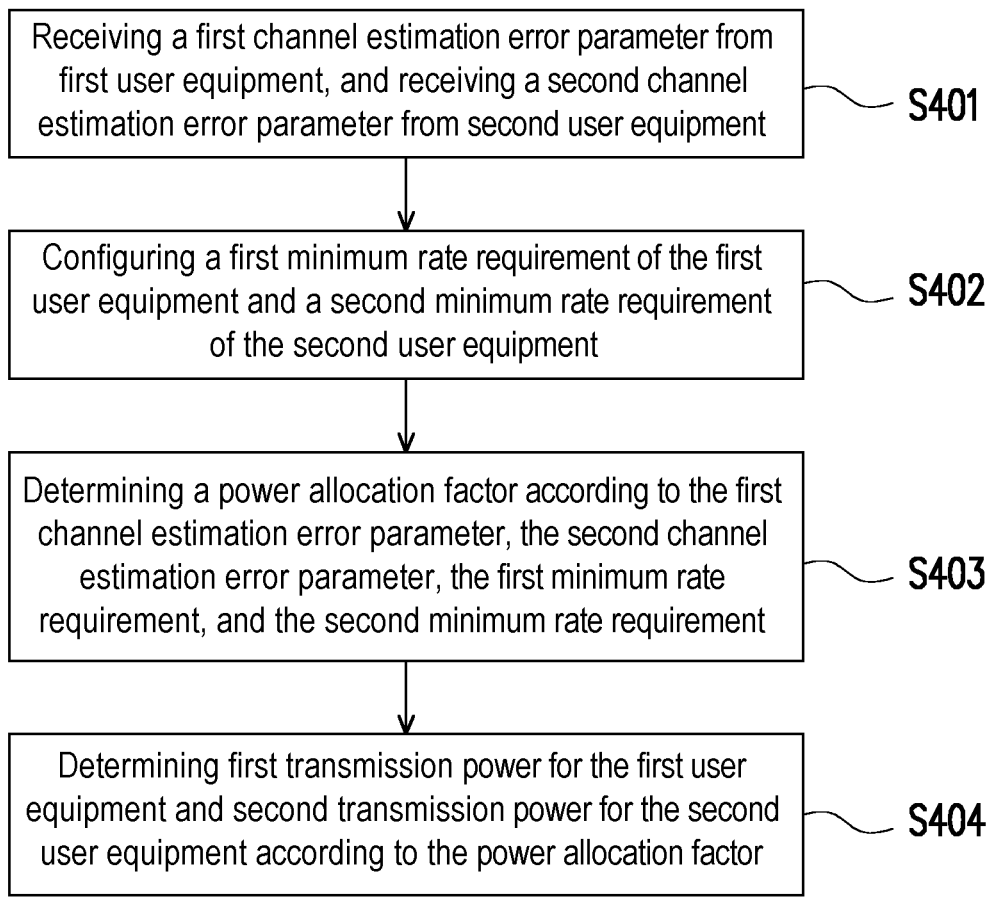
FIG. 4 is a second flowchart illustrating a power allocation method according to an embodiment of the disclosure.

Refer to FIG. 4. It is a second flowchart illustrating a power allocation method according to an embodiment of the disclosure. The method of this embodiment is adapted to the NOMA system 100 of FIG. 1, and each step of FIG. 4 will be described in detail with reference to each element shown in FIG. 1 and FIG. 2.

In step S401, the processor 230 receives a first channel estimation error parameter from first UE 121 and receives a second channel estimation error parameter from second UE 122 through the transceiver 210. In an embodiment, the first channel estimation error parameter and the second channel estimation error parameter represent respectively the MSEs of the channel estimations corresponding to the first UE 121 and the second UE 122, which can be respectively expressed as $\sigma_{\Delta h_1}^2$ and $\sigma_{\Delta h_2}^2$, or $\sigma_{\Delta H_1}^2$ and $\sigma_{\Delta H_2}^2$ as described above; In other words, after performing the channel estimations, the first UE 121 and the second UE 122 respectively return their MSEs of the channel estimations to the base station 110.

Further, in an embodiment, after performing the channel estimations, the first UE 121 and the second UE 122 can also return other channel estimation results to the base station 110. Accordingly, the processor 230 can receive a first channel estimation parameter from the first UE and receives a second channel estimation parameter from the second UE through the transceiver 210. In an embodiment, the first channel estimation parameter and the second channel estimation parameter are respectively variances of channel fading coefficient estimates corresponding to the first UE 121 and the second UE 122; that is, the first channel estimation parameter and the second channel estimation parameter can be respectively expressed as $\sigma_{\hat{h}_1}^2$ and $\sigma_{\hat{h}_2}^2$, or $\sigma_{\hat{H}_1}^2$ and $\sigma_{\hat{H}_2}^2$, as described above.

In step S402, the processor 230 configures a first minimum rate requirement (unit: bps/Hz) of the first UE 121 and a second minimum rate requirement (unit: bps/Hz) of the second UE 122. In other words, the base station 110 configures the first minimum rate requirement of the first UE 121 and the second minimum rate requirement of the second UE 122 on the basis of ensuring the QoS of the first UE 121 and the second UE 122. Here, the first minimum rate requirement and the second minimum rate requirement can be respectively expressed as $R_1^T$ and $R_2^T$ as described above, and their values may be the same or different, and may also be pre-configured or dynamically configured. The disclosure is not limited thereto.

In step S403, the processor 230 determines a power allocation factor according to the first channel estimation error parameter, the second channel estimation error parameter, the first minimum rate requirement, and the second minimum rate requirement. In an embodiment, the power allocation factor is determined based on minimizing a system outage probability upper bound, and the system outage probability upper bound is determined based on satisfying a plurality of constraints set according to the first minimum rate requirement and the second minimum rate requirement. Here, whether the constraints are satisfied or not is determined based on a channel capacity lower bound of the first UE 121 and a channel capacity lower bound of the second UE 122. Based on the above principles and requirements, in an embodiment, in the case of communicating through the SISO channel, the processor 230 can directly obtain the power allocation factor $\alpha_{IP}^{opt}$ according to formula (23), where $\phi_1=2^{R_1^T}-1$ and $\phi_2=2^{R_2^T}-1$. In the case of communicating through the MIMO channel, the processor 230 can directly calculate the power allocation factor $\tilde{\alpha}_{IP}^{opt}$ according to equation (32). Here, the base station has $M_T$ transmitting antennas; each of the first UE 121 and the second UE 122 has $M_R$ receiving antennas; $M_{min}$ is a smaller value between $M_R$ and $M_T$; $\tilde{\phi}_1=2^{R_1^T/M_{min}}-1$; and $\tilde{\phi}_2=2^{R_2^T/M_{min}}-1$. Further, in an embodiment, the power allocation factor may also be determined according to the first channel estimation parameter returned by the first UE 121 and the second channel estimation parameter returned by the second UE 122. In the SISO communication environment, the processor 230 can directly calculate the power allocation factor $\alpha_{IP}^{opt}$ according to equation (22), where $\phi_1=2^{R_1^T}-1$ and $\phi_2=2^{R_2^T}-1$. In the MIMO communication environment, the processor 230 can directly calculate the power allocation factor $\tilde{\alpha}_{IP}^{opt}$ according to equation (31). Here, the base station has $M_T$ transmitting antennas; each of the first UE 121 and the second UE 122 has $M_R$ receiving antennas; $M_{min}$ is a smaller value between $M_T$ and $M_R$; $\tilde{\phi}_1=2^{R_1^T/M_{min}}-1$; and $\tilde{\phi}_2=2^{R_1^T/M_{min}}-1$. In summary, regardless of whether it is the SISO or MIMO communication, the processor 230 can efficiently determine the power allocation factor with low computational complexity, and improve the performance of the NOMA system in the imperfect channel estimation environment.

In step S404, the processor 230 determines first transmission power for the first UE 121 and second transmission power for the second UE 122 according to the power allocation factor. In other words, the processor 230 can obtain the first transmission power by multiplying the power allocation factor $\alpha_{IP}^{opt}$ or $\tilde{\alpha}_{IP}^{opt}$ with total transmission power, and obtain the second transmission power by subtracting the first transmission power from the total transmission power. Here, it is assumed that a channel gain of the first UE 121 is greater than a channel gain of the second UE 122, and thus the power allocation factor needs to be greater than 0 and less than ½.

To sum up, in the embodiments of the disclosure, a power allocation method is proposed for NOMA systems under practical environments with imperfect channel estimation. Compared with the traditional power allocation solutions that were developed based on an assumption of perfect channel estimation, the proposed power allocation method in the disclosure is developed according to the channel estimation error information retuned by the corresponding pieces of UE, and can provide better performance for NOMA systems with imperfect channel estimation. Also, the proposed power allocation method in the disclosure allows each UE to have a basic minimum rate while minimizing an upper bound of the system outage probability. Moreover, by using the closed-form formulas presented in the embodiments of the disclosure, the power allocation factor for NOMA systems can easily be determined with low computational complexity.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The invention claimed is:

1. A power allocation method for a non-orthogonal multiple access (NOMA) system adapted to a base station, the method comprising:
    receiving a first channel estimation error parameter of downlink channel estimation performed by first user equipment from the first user equipment, and receiving a second channel estimation error parameter of downlink channel estimation performed by second user equipment from the second user equipment;
    configuring a first minimum rate requirement of the first user equipment and a second minimum rate requirement of the second user equipment;
    determining a power allocation factor according to the first channel estimation error parameter, the second channel estimation error parameter, the first minimum rate requirement, and the second minimum rate requirement; and
    determining first transmission power for the first user equipment and second transmission power for the second user equipment according to the power allocation factor.

2. The power allocation method of claim 1, wherein the first channel estimation error parameter and the second channel estimation error parameter are respectively mean-squared errors (MSEs) of channel estimations corresponding to the first user equipment and the second user equipment.

3. The power allocation method of claim 1, wherein a channel gain of the first user equipment is greater than a channel gain of the second user equipment, and the second transmission power is greater than the first transmission power, wherein the step of determining the first transmission power for the first user equipment and the second transmission power for the second user equipment according to the power allocation factor comprises:
    obtaining the first transmission power by multiplying the power allocation factor with total transmission power, wherein the power allocation factor is greater than and less than ½; and
    obtaining the second transmission power by subtracting the first transmission power from the total transmission power.

4. The power allocation method of claim 1, wherein the power allocation factor is determined based on minimizing a system outage probability upper bound, and the system outage probability upper bound is determined based on a plurality of constraints related to the first minimum rate requirement and the second minimum rate requirement.

5. The power allocation method of claim 1, wherein the base station communicates with the first user equipment and the second user equipment through a single-input single-output (SISO) channel, the first minimum rate requirement is expressed as $R_1^T$, the second minimum rate requirement is expressed as $R_2^T$, the first channel estimation error parameter is expressed as $\sigma_{\Delta h_1}^2$, the second channel estimation error parameter is expressed as $\sigma_{\Delta h_2}^2$, and the power allocation factor is expressed as:

$$\alpha_{IP}^{opt} \approx \frac{1}{\sqrt{\frac{\sigma_{\Delta h_1}^2(\phi_2+\phi_2^2)(\sigma_{\Delta h_2}^2 P_T + N_0)}{\sigma_{\Delta h_2}^2 \phi_1(\sigma_{\Delta h_1}^2 P_T + N_0)}}+1+\phi_2}$$

wherein $\phi_1=2^{R_1^T}-1$ and $\phi_2=2^{R_2^T}-1$, $(\phi_1/(1+\phi_1))\leq\phi_2$, $P_T$ is total transmission power of the non-orthogonal multiple access system, and $N_0$ is noise power.

6. The power allocation method of claim 1, wherein the base station communicates with the first user equipment and the second user equipment through a multiple-input multiple-output (MIMO) channel, the base station has $M_T$ transmitting antennas, each of the first user equipment and the second user equipment has $M_R$ receiving antennas, a smaller value between $M_T$ and $M_R$ is expressed as $M_{min}$, the first minimum rate requirement is expressed as $R_1^T$, the second minimum rate requirement is expressed as $R_2^T$, the first channel estimation error parameter is expressed as $\sigma_{\Delta H_1}^2$, the second channel estimation error parameter is expressed as $\sigma_{\Delta H_2}^2$, and the power allocation factor is expressed as:

$$\tilde{\alpha}_{IP}^{opt} \approx \frac{1}{\sqrt{\frac{(\sigma_{\Delta H_1}^2/(M_{min}M_T))(\tilde{\phi}_2+\tilde{\phi}_2^2)(M_R\sigma_{\Delta H_2}^2 P_T + N_0)}{(\sigma_{\Delta H_2}^2/(M_{min}M_T))\tilde{\phi}_1(M_R\sigma_{\Delta H_1}^2 P_T + N_0)}} + 1 + \tilde{\phi}_2}$$

wherein $\tilde{\phi}_1 = 2^{R_1^T/M_{min}} - 1$, $\tilde{\phi}_2 = 2^{R_2^T/M_{min}} - 1$, and $(\tilde{\phi}_1/(1+\tilde{\phi}_1)) \leq \tilde{\phi}_2$, $P_T$ is total transmission power of the non-orthogonal multiple access system, and No is noise power.

7. The power allocation method of claim 1, wherein the method further comprises:
receiving a first channel estimation parameter from the first user equipment, and receiving a second channel estimation parameter from the second user equipment, wherein the first channel estimation parameter and the second channel estimation parameter are respectively variances of channel fading coefficient estimates corresponding to the first user equipment and the second user equipment, and the power allocation factor is further determined according to the first channel estimation parameter and the second channel estimation parameter.

8. The power allocation method of claim 7, wherein the base station communicates with the first user equipment and the second user equipment through a single-input single-output (SISO) channel, the first minimum rate requirement is expressed as $R_1^T$, the second minimum rate requirement is expressed as $R_2^T$, the first channel estimation error parameter is expressed as $\sigma_{\Delta h_1}^2$, the second channel estimation error parameter is expressed as $\sigma_{\Delta h_2}^2$, the first channel estimation parameter is expressed as $\sigma_{\hat{h}_1}^2$, the second channel estimation parameter is expressed as $\sigma_{\hat{h}_2}^2$, and the power allocation factor is expressed as:

$$\alpha_{IP}^{opt} = \frac{1}{\sqrt{\frac{\sigma_{\hat{h}_1}^2 (\phi_2 + \phi_2^2)(\sigma_{\Delta h_2}^2 P_T + N_0)}{\sigma_{\hat{h}_2}^2 \phi_1 (\sigma_{\Delta h_1}^2 P_T + N_0)}} + 1 + \phi_2}$$

wherein $\phi_1 = 2^{R_1^T} - 1$, $\phi_2 = 2^{R_2^T} - 1$, $(\phi_1/(1+\phi_1)) \leq \phi_2$, $P_T$ is total transmission power of the non-orthogonal multiple access system, and $N_0$ is noise power.

9. The power allocation method of claim 7, wherein the base station communicates with the first user equipment and the second user equipment through a multiple-input multiple-output (MIMO) channel, the base station has $M_T$ transmitting antennas, each of the first user equipment and the second user equipment has $M_R$ receiving antennas, a smaller value between $M_T$ and $M_R$ is expressed as $M_{min}$, the first minimum rate is expressed as $R_1^T$, the second minimum rate requirement is expressed as $R_2^T$, the first channel estimation error parameter is expressed as $\sigma_{\Delta h_1}^2$, the second channel estimation error parameter is expressed as $\sigma_{\Delta h_2}^2$, the first channel estimation parameter is expressed as $\sigma_{\hat{h}_1}^2$, the second channel estimation parameter is expressed as $\sigma_{\hat{h}_2}^2$, and the power allocation factor is expressed as:

$$\tilde{\alpha}_{IP}^{opt} = \frac{1}{\sqrt{\frac{(\sigma_{\hat{h}_1}^2/(M_{min}M_T))(\tilde{\phi}_2+\tilde{\phi}_2^2)(M_R\sigma_{\Delta H_2}^2 P_T + N_0)}{(\sigma_{\hat{h}_2}^2/(M_{min}M_T))\tilde{\phi}_1(M_R\sigma_{\Delta H_1}^2 P_T + N_0)}} + 1 + \tilde{\phi}_2}$$

wherein $\tilde{\phi}_1 = 2^{R_1^T/M_{min}} - 1$, $\tilde{\phi}_2 = 2^{R_2^T/M_{min}} - 1$, and $(\tilde{\phi}_1/(1+\tilde{\phi}_1)) \leq \tilde{\phi}_2$, $P_T$ is total transmission power of the non-orthogonal multiple access system, and $N_0$ is noise power.

10. A base station, adapted to serve first user equipment and second user equipment in a non-orthogonal multiple access system, the base station comprising:
a transceiver, configured to transmit messages to the first user equipment and the second user equipment;
a storage circuit, storing a plurality of modules; and
a processor, coupled to the storage circuit and the transceiver, and configured to access the modules and execute steps of:
receiving a first channel estimation error parameter of downlink channel estimation performed by the first user equipment from the first user equipment, and receiving a second channel estimation error parameter of downlink channel estimation performed by the second user equipment from the second user equipment;
configuring a first minimum rate requirement of the first user equipment and a second minimum rate requirement of the second user equipment;
determining a power allocation factor according to the first channel estimation error parameter, the second channel estimation error parameter, the first minimum rate requirement, and the second minimum rate requirement; and
determining first transmission power for the first user equipment and second transmission power for the second user equipment according to the power allocation factor.

11. The base station of claim 10, wherein the first channel estimation error parameter and the second channel estimation error parameter are respectively mean-squared errors (MSEs) of channel estimations corresponding to the first user equipment and the second user equipment.

12. The base station of claim 10, wherein a channel gain of the first user equipment is greater than a channel gain of the second user equipment, the second transmission power is greater than the first transmission power, and the processor is configured for:
obtaining the first transmission power by multiplying the power allocation factor with total transmission power, wherein the power allocation factor is greater than 0 and less than ½; and
obtaining the second transmission power by subtracting the first transmission power from the total transmission power.

13. The base station of claim 10, wherein the power allocation factor is determined based on minimizing a system outage probability upper bound, and the system outage probability upper bound is determined based on a plurality of constraints related to the first minimum rate requirement and the second minimum rate requirement.

14. The base station of claim 10, wherein the base station communicates with the first user equipment and the second user equipment through a single-input single-output (SISO) channel, the first minimum rate requirement is is expressed as $R1^T$, the second minimum rate requirement is expressed as $R_2^T$, the first channel estimation error parameter is expressed as $\sigma_{\Delta h_1}^2$, the second channel estimation error parameter is expressed as $\sigma_{\Delta h_2}^2$, and the power allocation factor is expressed as:

$$\alpha_{IP}^{opt} \approx \frac{1}{\sqrt{\frac{\sigma_{\Delta h_1}^2(\phi_2 + \phi_2^2)(\sigma_{\Delta h_2}^2 P_T + N_0)}{\sigma_{\Delta h_2}^2 \phi_1(\sigma_{\Delta h_1}^2 P_T + N_0)}} + 1 + \phi_2}$$

wherein $\phi_1 = 2^{R_1 T} - 1$ and $\phi_2 = 2^{R_2 T} - 1$, $(\phi_1/(1+\phi_1)) \leq \phi_2$, $P_T$ is total transmission power of the non-orthogonal multiple access system, and $N_0$ is noise power.

15. The base station of claim 10, wherein the base station communicates with the first user equipment and the second user equipment through a multiple-input multiple-output (MIMO) channel, the base station has $M_T$ transmitting antennas, each of the first user equipment and the second user equipment has $M_R$ receiving antennas, a smaller value between $M_T$ and $M_R$ is expressed as $M_{min}$, the first minimum rate requirement is expressed as $R_1^T$, the second minimum rate requirement is expressed as $R_2^T$, the first channel estimation error parameter is expressed as $\sigma_{\Delta H_1}^2$, the second channel estimation error parameter is expressed as $\sigma_{\Delta H_2}^2$, and the power allocation factor is expressed as:

$$\tilde{\alpha}_{IP}^{opt} \approx \frac{1}{\sqrt{\frac{(\sigma_{\Delta H_1}^2/(M_{min} M_T))(\tilde{\phi}_2 + \tilde{\phi}_2^2)(M_R \sigma_{\Delta H_2}^2 P_T + N_0)}{(\sigma_{\Delta H_2}^2/(M_{min} M_T))\tilde{\phi}_1(M_R \sigma_{\Delta H_1}^2 P_T + N_0)}} + 1 + \tilde{\phi}_2}$$

wherein $\tilde{\phi}_1 = 2^{R_1 T/M_{min}} - 1$, $\tilde{\phi}_2 = 2^{R_2 T/M_{min}} - 1$, and $(\tilde{\phi}_1/(1+\tilde{\phi}_1)) \leq \tilde{\phi}_2$, $P_T$ is total transmission power of the non-orthogonal multiple access system, and $N_0$ is noise power.

16. The base station of claim 10, wherein the processor is further configured for:
receiving a first channel estimation parameter from the first user equipment, and receiving a second channel estimation parameter from the second user equipment, wherein the first channel estimation parameter and the second channel estimation parameter are respectively variances of channel fading coefficient estimates corresponding to the first user equipment and the second user equipment, and the power allocation factor is further determined according to the first channel estimation parameter and the second channel estimation parameter.

17. The base station of claim 16, wherein the base station communicates with the first user equipment and the second user equipment through a single-input single-output (SISO) channel, the first minimum rate requirement is is expressed as $R_1^T$, the second minimum rate requirement is expressed as $R_2^T$, the first channel estimation error parameter is expressed as $\sigma_{\Delta h_1}^2$, the second channel estimation error parameter is expressed as $\sigma_{\Delta h_2}^2$, the first channel estimation parameter is expressed as $\sigma_{\hat{h}_1}^2$, the second channel estimation parameter is expressed as $\sigma_{\hat{h}_2}^2$, and the power allocation factor is expressed as:

$$\alpha_{IP}^{opt} = \frac{1}{\sqrt{\frac{\sigma_{\hat{h}_1}^2(\phi_2 + \phi_2^2)(\sigma_{\Delta h_2}^2 P_T + N_0)}{\sigma_{\hat{h}_2}^2 \phi_1(\sigma_{\Delta h_1}^2 P_T + N_0)}} + 1 + \phi_2}$$

wherein $\phi_1 = 2^{R_1 T} - 1$, $\phi_2 = 2^{R_2 T} - 1$, $(\phi_1/(1+\phi_1)) \leq \phi_2$, $P_T$ is total transmission power of the non-orthogonal multiple access system, and $N_0$ is noise power.

18. The base station of claim 16, wherein the base station communicates with the first user equipment and the second user equipment through a multiple-input multiple-output (MIMO) channel, the base station has $M_T$ transmitting antennas, each of the first user equipment and the second user equipment has $M_R$ receiving antennas, a smaller value between $M_T$ and $M_R$ is expressed as $M_{min}$, the first minimum rate requirement is expressed as $R_1^1$, the second minimum rate requirement is expressed as $R_2^T$, the first channel estimation error parameter is expressed as $\sigma_{\Delta H_1}^2$, the second channel estimation error parameter is expressed as $\sigma_{\Delta H_2}^2$, the first channel estimation parameter is expressed as $\sigma_{\hat{H}_1}^2$, the second channel estimation parameter is expressed as $\sigma_{\hat{H}_2}^2$, and the power allocation factor is expressed as:

$$\tilde{\alpha}_{IP}^{opt} = \frac{1}{\sqrt{\frac{(\sigma_{\hat{H}_1}^2/(M_{min} M_T))(\tilde{\phi}_2 + \tilde{\phi}_2^2)(M_R \sigma_{\Delta H_2}^2 P_T + N_0)}{(\sigma_{\hat{H}_2}^2/(M_{min} M_T))\tilde{\phi}_1(M_R \sigma_{\Delta H_1}^2 P_T + N_0)}} + 1 + \tilde{\phi}_2}$$

wherein $\phi_1 = 2^{R_1 T} - 1$, $\phi_2 = 2^{R_2 T} - 1$, $(\phi_1/(1+\phi_1)) \leq \phi_2$, $P_T$ is total transmission power of the non-orthogonal multiple access system, and $N_0$ is noise power.

* * * * *